US008415592B2

(12) United States Patent
Kuenen (10) Patent No.: US 8,415,592 B2
(45) Date of Patent: Apr. 9, 2013

(54) OVEN AND PROCESS TO CONTROL THE AIR-FLOW OVER THE BELT WIDTH IN A SPIRAL OVEN

(75) Inventor: Hendrikus Antonius Jacobus Kuenen, Overloon (NL)

(73) Assignee: CFS Bakel B.V., En Bakel (NL)

( * ) Notice: Subject to any disclaimer, the term of this patent is extended or adjusted under 35 U.S.C. 154(b) by 0 days.

(21) Appl. No.: 12/999,699

(22) PCT Filed: Jun. 19, 2009

(86) PCT No.: PCT/EP2009/004462
§ 371 (c)(1),
(2), (4) Date: Mar. 11, 2011

(87) PCT Pub. No.: WO2009/153062
PCT Pub. Date: Dec. 23, 2009

(65) Prior Publication Data
US 2011/0168689 A1    Jul. 14, 2011

(30) Foreign Application Priority Data

Jun. 19, 2008  (EP) .................................... 08011161

(51) Int. Cl.
*F27D 5/00*       (2006.01)
*A47J 37/12*      (2006.01)
(52) U.S. Cl. ........ 219/392; 219/387; 219/388; 219/391; 219/395; 219/400; 219/492; 219/413; 219/494; 219/497; 99/325; 99/407; 99/330; 99/326; 99/336; 99/337; 99/338

(58) Field of Classification Search .................. 219/392, 219/387–8, 391, 395, 400, 492, 413, 494, 219/497; 99/325, 407, 330, 326, 336–8
See application file for complete search history.

(56) References Cited

U.S. PATENT DOCUMENTS

| | | | |
|---|---|---|---|
| 2,161,211 | A | 6/1939 | Werner |
| 2,767,668 | A | 10/1956 | Spooner |
| 2,784,685 | A | 3/1957 | Naylor |
| 3,908,533 | A | 9/1975 | Fagerstrom |
| 4,344,973 | A | 8/1982 | Blake et al. |
| 4,348,948 | A | 9/1982 | Allison |

(Continued)

FOREIGN PATENT DOCUMENTS

| | | |
|---|---|---|
| EP | 0528593 B1 | 2/1993 |
| EP | 0558151 A1 | 9/1993 |

(Continued)

OTHER PUBLICATIONS

International Search Report PCT/EP2009/004462, dated Sep. 7, 2009.

(Continued)

*Primary Examiner* — Shawntina Fuqua
(74) *Attorney, Agent, or Firm* — The Dobrusin Law Firm, P.C.

(57) ABSTRACT

The present invention relates to an oven comprising a first chamber and a second chamber, which are separated by separation means, conveyor means for guiding products from the inlet through these chambers to the outlet, temperature control means for controlling the temperature in each chamber individually using a fluid, respectively, and means to adjust the flow distribution over the width of the conveyor means depending on at least one process parameter or recipe.

20 Claims, 9 Drawing Sheets

U.S. PATENT DOCUMENTS

| | | | |
|---|---|---|---|
| 4,563,945 | A | 1/1986 | Hwang |
| 4,631,029 | A | 12/1986 | Lanham et al. |
| 4,726,766 | A | 2/1988 | Stewart et al. |
| 4,737,373 | A | 4/1988 | Forney |
| 5,078,120 | A | 1/1992 | Hwang |
| 5,189,948 | A | 3/1993 | Liebermann |
| 5,243,962 | A | 9/1993 | Hwang |
| 5,407,692 | A | 4/1995 | Caridis et al. |
| 5,423,248 | A | 6/1995 | Smith et al. |
| 5,564,332 | A | 10/1996 | Ludwig |
| 5,836,240 | A | 11/1998 | Kuenen |
| 5,850,781 | A | 12/1998 | Kuenen |
| 5,881,636 | A | 3/1999 | Sweet et al. |
| 5,947,015 | A | 9/1999 | Laurbak |
| 6,049,066 | A | 4/2000 | Wilson |
| 6,065,463 | A | 5/2000 | Martin |
| 6,095,805 | A | 8/2000 | Kuenen |
| 6,105,490 | A | 8/2000 | Horn |
| 6,138,660 | A | 10/2000 | Middleton |
| 6,146,678 | A | 11/2000 | Caridis et al. |
| 6,247,922 | B1 | 6/2001 | Kuenen |
| 6,259,064 | B1 | 7/2001 | Wilson |
| 6,320,165 | B1 | 11/2001 | Ovadia |
| 6,658,993 | B2 | 12/2003 | Kuenen |
| 6,707,010 | B2 | 3/2004 | Kuenen |
| 6,730,341 | B2 | 5/2004 | Ludwig |
| 6,745,671 | B2 | 6/2004 | Kuenen |
| 7,524,520 | B2 | 4/2009 | Ludwig |
| 2007/0137633 | A1 | 6/2007 | McFadden |
| 2009/0323465 | A1 | 12/2009 | Simonsen |

FOREIGN PATENT DOCUMENTS

| | | | |
|---|---|---|---|
| EP | 0804878 | A1 | 11/1997 |
| EP | 0859199 | A1 | 8/1998 |
| EP | 0953286 | A1 | 11/1999 |
| EP | 1221575 | A1 | 7/2002 |
| EP | 1602279 | * | 12/2005 |
| EP | 1602279 | A | 12/2005 |
| GB | 803740 | A | 10/1958 |
| GB | 903110 | A | 8/1962 |
| GB | 1381751 | A | 1/1975 |
| GB | 2311268 | * | 9/1997 |
| GB | 2311268 | A | 9/1997 |
| WO | WO85/05546 | A1 | 12/1985 |
| WO | WO/88/09124 | A1 | 12/1988 |
| WO | WO00/13528 | A1 | 3/2000 |
| WO | 2007/028989 | A | 3/2007 |

OTHER PUBLICATIONS

Procter & Schwartz, Inc. "Continuous Cooking Systems" Brochure.
Unitherm Bulletin, Affidavit of David Howard, pp. 1-3 Dated 1994.
Unitherm Stainless Steel Inc, Receipt, pp. 1-16, dated Jun. 9, 1993.
Unitherm, Rapid Flow, Design of Product & Brochure pp. 17-55, dated 1997.
Baron "Fine Cooked Meats" letter sent to Uniterm Stainless Steel, Ltd. pp. 56-57, Dated Jun. 17, 1993.
Unitherm "Flowing Stream III, Advanced Smoking System" pp. 58-60, No date available.
Unitherm Letter to Delta DailyFood Texas, Inc., pp. 61-66, dated Nov. 16, 1998.
"Accepted Meat and Poultry Equipment" pp. 67-68, dated Sep. 20, 1995.
Unitherm Letter to Schreiber Foods pp. 69-76, dated Jan. 1994.
Related Application Reexamination ordered to U.S. Appl. No. 90/020,004 filed on Jul. 19, 2012.

* cited by examiner

Fig. 9

OVEN AND PROCESS TO CONTROL THE AIR-FLOW OVER THE BELT WIDTH IN A SPIRAL OVEN

CLAIM OF BENEFIT OF FILING DATE

The present application claims the benefit of the filing date of PCT Application Serial No. PCT/EP2009/004462 (filed Jun. 19, 2009) (Published as WO 2009/153062) and EP 08011161.0 (filed Jun. 19, 2008), the contents of which are hereby incorporated by reference in their entirety.

The present invention relates to an oven comprising:
a first chamber,
conveyor means with a width for guiding products from the inlet through this chambers to the outlet, whereas the conveyor means are at least partially arranged in a helical path,
temperature control means for controlling the temperature and/or humidity in the chamber using a fluid, which comprise a heater to heat the fluid and a duct to introduce the heated fluid into the chamber, The present invention further relates to a process how to operate this oven.

An oven of this type is for example known from EP 1 221 575 and EP 0 558 151 and is suitable for the complete or partial cooking of edible products, especially protein containing products, like chicken, hamburgers, cordon bleu etc. The above mentioned patent applications are herewith included by reference and are therefore part of the disclosure of the present patent application. The temperature and humidity can be set such, that during the residence time in the oven, which is dependent on the length and velocity of the conveyor belt, the desired cooking and, if needed, browning is effected.

The spiral ovens known from the state of the art have the potential risk, that there are conditions in the oven, resulting in differences in temperature, color and/or yield. The consequences are products with differences in temperature, color and/or moisture content. Differences in one of these parameters will result in unequal and lower quality of the products.

It is therefore an objective of the present invention to provide an oven and a process that leads to uniform, high quality products.

The problem is solved by an oven according to claim 1 or 2.

Due to the adjustment of the fluid flow over the width of the conveyor means, the resulting products are much more uniform and have thus a higher quality. The inventive oven is easily operated.

The oven according to the present invention comprises at least one chamber. The inventive oven further comprises conveyor means for guiding products from the inlet through this chamber to the outlet. The conveyor means are at least partially arranged in a helical path. The conveyor means are preferably an endless conveyor belt, which more preferably is at least partially permeable for the process fluid. Additionally, the inventive oven comprises temperature control means for controlling the temperature and/or humidity in the chamber using a fluid, which is normally a mixture of air and steam. The temperature of the fluid is adjusted by a heater. The humidity of the fluid is adjusted by adding steam or for example air with a low humidity. Preferably, the fluid is circulated in the chamber, preferably by a fan, which extracts the fluid out of the chamber at one end and reintroduces the fluid at another end. Due to this recirculation, there is a fluid-motion in the chamber that improves the heat-transfer from the fluid to the product and/or reduces temperature differences in the chamber.

Furthermore, the oven comprises means to adjust the flow-rate-distribution over the width of the conveyor means depending on at least one process parameter and/or a recipe.

Conveyor means-width according to the present invention means the width at a discrete point or in a discrete region of the conveyor means. Normally, the width is uniform over its entire length. The width is the extension of the conveyor means perpendicular to its direction of motion.

The flow-rate-distribution can be adjusted to any desired pattern over the width. A certain recipe can require a certain flow-rate-distribution, which is e.g. stored in computer means associated with the inventive oven and can be downloaded. The desired flow-rate-distribution can be constant over time or can be changed for example according to a recurrent pattern.

The means adjust the flow-rate-distribution over the width of the conveyor means according to a certain recipe or based on a certain parameter. As soon as the recipe, e.g. the product to be cooked and/or the degree of cooking and/or browning or a parameter changes, the flow pattern is adjusted. A preferred pattern is a uniform flow-rate over the width of the conveyor means.

Preferably, the means to adjust the flow-rate-distribution over the width of the conveyor means extend or are moveable over essentially the entire width of the conveyor means.

A process parameter is for example the product temperature and/or the moisture content of the product before it enters the oven and/or after it leaves the oven, respectively, the product color after it leaves the oven, the seize of the products and/or whether the product comprises bones or not. Other parameters are the temperature and/or humidity of the process-fluid and/or its distribution, especially over the width of the conveyor means and/or in the chamber. Another parameter is the flow-rate at which the process fluid is recycled.

The means to adjust the flow-rate-distribution can be operated manually or automatically. Preferably, they are automatically controlled by computer means, for example a PLC, which receives information about the actual flow pattern over the width and/or data of at least one parameter. If the flow pattern and/or the parameter is not in the desired range, the distribution of the flow-rate over the width will be adjusted.

The parameter(s) can be measured manually or automatically, inline and/or offline.

Preferably, the inventive oven comprises temperature-measuring-means, like a thermocouple or an infrared camera, optical means to measure the size of the product and/or to inspect the color of the products, means to measure the moisture of the products and/or means to measure the a volume-flow-rate, fluid-velocities, the relative humidity of the process fluid and/or velocity-distributions. These measurements can be executed before, in and/or after the oven.

Preferably, the flow-rate-distribution is not only adjusted at a discrete point along the conveyor means, but over a certain length. This length is preferably the length of a 90° radius of the helical part and/or the length of the straight part. Preferably, the length is between one and 6 meters for one chamber.

Preferably, the means to adjust the flow-rate distribution over the width is a flow-divider and/or a flow-guider. This means spreads the fluid-flow such, that the desired flow-pattern over the belt-width is achieved.

In a preferred embodiment of the present invention, the means to adjust the flow-rate is at least one plate, which is preferably pivotable around a bearing and which is more preferably motor-driven. Most preferably, the plate is oriented parallel or tangentially to the conveyor-means.

Preferably, the means adjust the flow-rate over the entire width of the conveyor means, i.e. since the entire volumeflow-rate is preferably not or only very little influenced by adjustment-means, the adjustment means increase the flow-rate in one section of the width, while simultaneously reducing the flow-rate in another section of the width. Only the distribution of the flow-rate is altered, while its integral over the width remains essentially the same.

Preferably, the means to adjust the flow-rate-distribution over the width are located in the area where the heated fluid is introduced into the chamber. Here the process fluid has its highest temperature and consequently influences the outcome of the product most.

Preferably, the adjustment means are located over a part, more preferably of the top turn, of the top turn of the helical path. More preferably, the adjustment means extent over 120°, even more preferably over 90°

Additionally and/or in another preferred embodiment of the present invention, the means to adjust the flow-rate-distribution over the width of the conveyor means are located in the straight conveyor means section.

Preferably, the overall magnitude of the volume-flow-rate can be increased, due to a better distribution of the process fluid over the width. This normally results in an improved cooking result.

In a preferred embodiment of the present invention, the oven comprises a second chamber with a second helical path of the conveyor means. The two chambers are separated by a partition. The two helical paths are preferably connected by a straight conveyor means section. The partition preferably comprises a passage through which the straight conveyor means section extends. Detail about ovens with two chambers are given in the above mentioned patent application. This disclosure is explicitly included by reference and thus part of the present disclosure.

Preferably, the adjustment means are located over a part, more preferably of the top turn, of the helical path. More preferably, the adjustment means extent over 120°, even more preferably over 90°. In a preferred embodiment of the present invention, the control means over the top turn of the helical path are located just before and/or just after the straight conveyor means between the helical paths.

Preferably, the adjustment means is a plate with one or more holes, whose size varies over the width of the conveyor means and/or the quantity of holes per unit of area of the plate varies over the width of the conveyor means. The plates can be manually exchanged and/or adjusted.

Additionally or in another preferred embodiment flow guiding means like for example a deflector plate is utilized to the flow-rate-distribution over the width of the helical path of the conveyor means. This can be done manually and/or automatically.

Additionally and/or in another preferred embodiment of the present invention, the means to adjust the flow-rate-distribution over the width of the conveyor means are located in the straight conveyor means section.

In a preferred combination, the flow-rate-distribution-adjustment is done by a plate and by the flow guiding means, which are preferably at least partially automated. The plate and the adjustment means can be arranged parallel or in series.

Preferably, the inventive oven comprises means to equalize the fluid-flow, which are more preferably located downstream of the means to adjust the flow-rate-distribution over the width of the conveyor means. Most preferably, this means to equalize the fluid-flow is a perforated plate.

Additionally or in yet another preferred embodiment, uniform cooking and/or browning of the products on the conveyor means, especially uniform cooking and browning over the width of the conveyor means can be achieved means of fluctuating the volume-flow of the heated fluid, its temperature, its humidity and/or its velocity with time. More preferably, the fluid is passed through a fixed plate with at least one fixed hole. This plate with the at least one hole is preferably located above the conveyor means. Preferably, the fluid flow will be ejected from a fixed spot.

The above made disclosure also applies to the subsequent inventive process and vice versa.

Another subject-matter of the present invention is a process according to claim 15 or 16.

Preferably, the flow-rate distribution is adjusted over the entire width of the conveyor means, i.e. the flow-rate is increased in one part of the belt-width and simultaneously decreased in another part of belt-width, while the integral over the width remains essentially unchanged Preferably the means to adjust the flow-rate over the width of the conveyor means are controlled based on a measurement. This measurement can be done manually, visually and/or automatically, inline and/or offline.

Preferably, the means to adjust the flow-rate over the width of the conveyor means guide and/or divide the flow according to the desired flow-pattern.

Preferably, the means to adjust the flow-rate over the width of the conveyor means are adjusted automatically, most preferably according to measured or preset parameters.

Subsequently, the inventions are explained according to the attached figures. These explanations do not limit the scope of protection.

Figure 1:
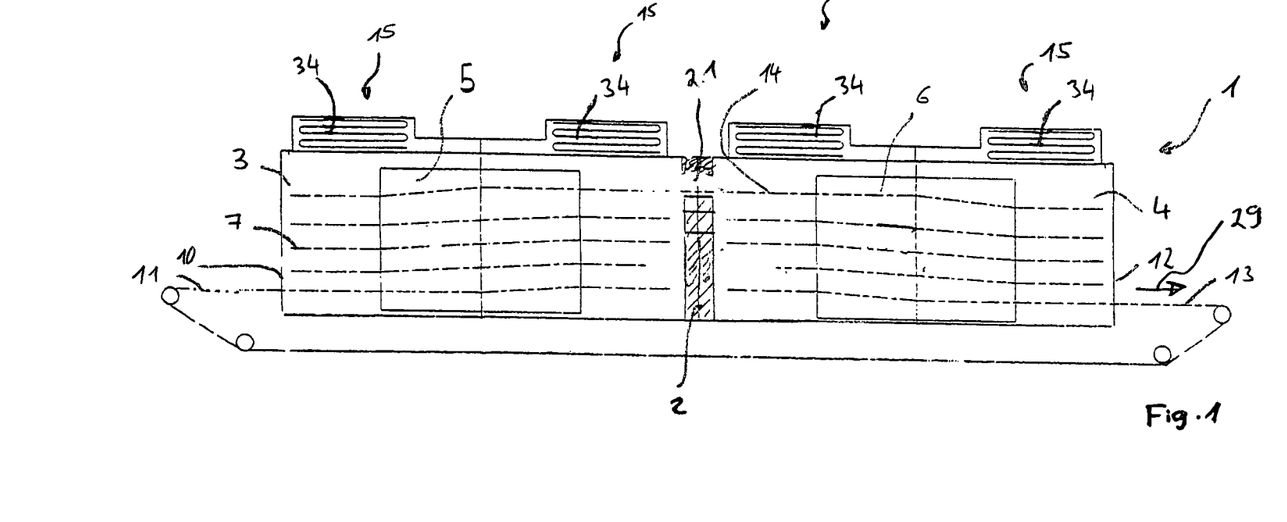
FIG. 1 shows one embodiment of the inventive oven.
Figure 2:
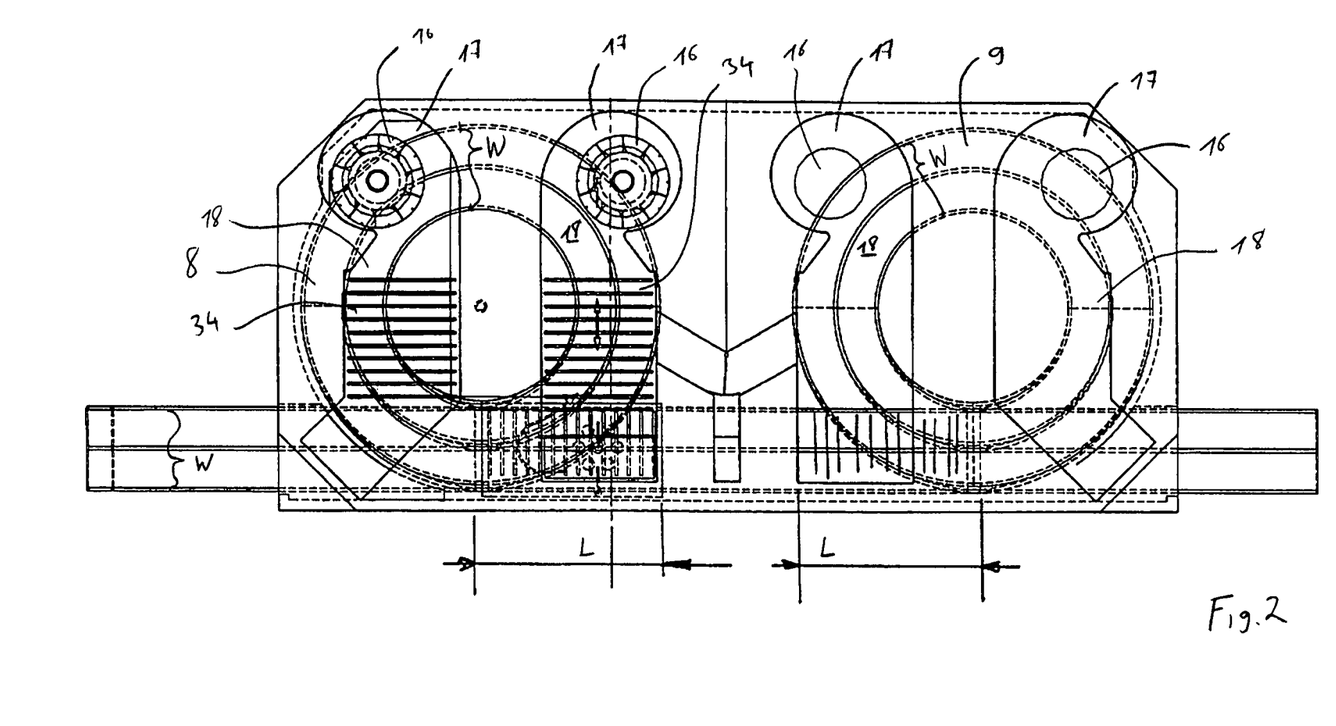
FIG. 2 is a top view of the oven according to FIG. 1.

FIGS. 1 and 2 show the inventive oven. The oven 1 comprises a first chamber 3 and a second chamber 4. The chambers are divided by means of a partition 2. A rotatable drum 5, 6 is arranged in each of these chambers, around which the conveyor belt 7 is guided along two helical paths 8, 9. The endless conveyor belt enters the oven 1 via the entrance 10 by a straight conveyor belt section 11 and leaves the oven 1 via the exit 12, likewise by means of a straight section 13. The two helical sections 8, 9 are connected by the straight conveyor belt section 14, which lies at the top. The belt is permeable to the process fluid, e.g. air and steam. The partition means 2 comprise a passage 2.1 for the belt section 14. This passage 2.1 is larger than the conveyor belt 14. The person skilled in the art understands that the oven needs not necessarily comprise two chambers.

The heating means, which are overall denoted by 15, are arranged in the top of the housing. These heating means 15 each comprise a fan 16 with a spiral casing 17, which opens into a duct 18. The heating elements 34 are situated in the ducts 18, respectively. The process fluid, e.g. air and steam, is sucked up by the fans 16 out of chambers 3, 4 via inlet 24 and is forced into the duct 18 via the spiral casing 17, respectively. The process fluid 31 flows past the heating elements 34 and is then recycled into the respective chamber 3, 4. Arrow 23, according to FIG. 3, depicts the fluid flow in the chamber 3, 4.

The motion of the products (not depicted) to be cooked in the oven is depicted by arrows 29.

Figure 3:
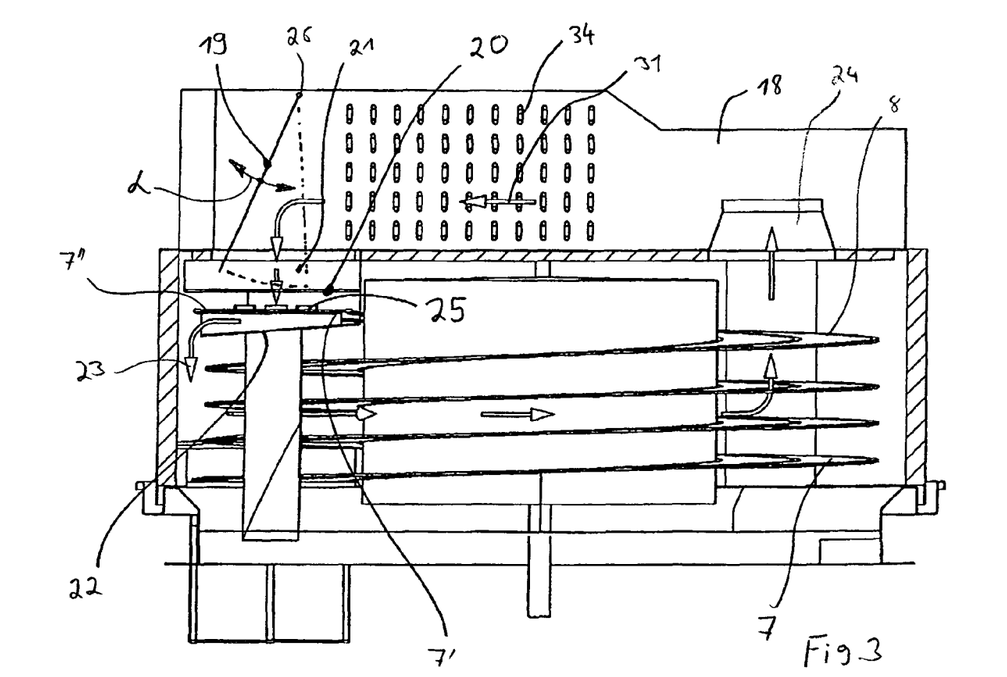
FIG. 3 shows the adjustment means.
Figure 7:
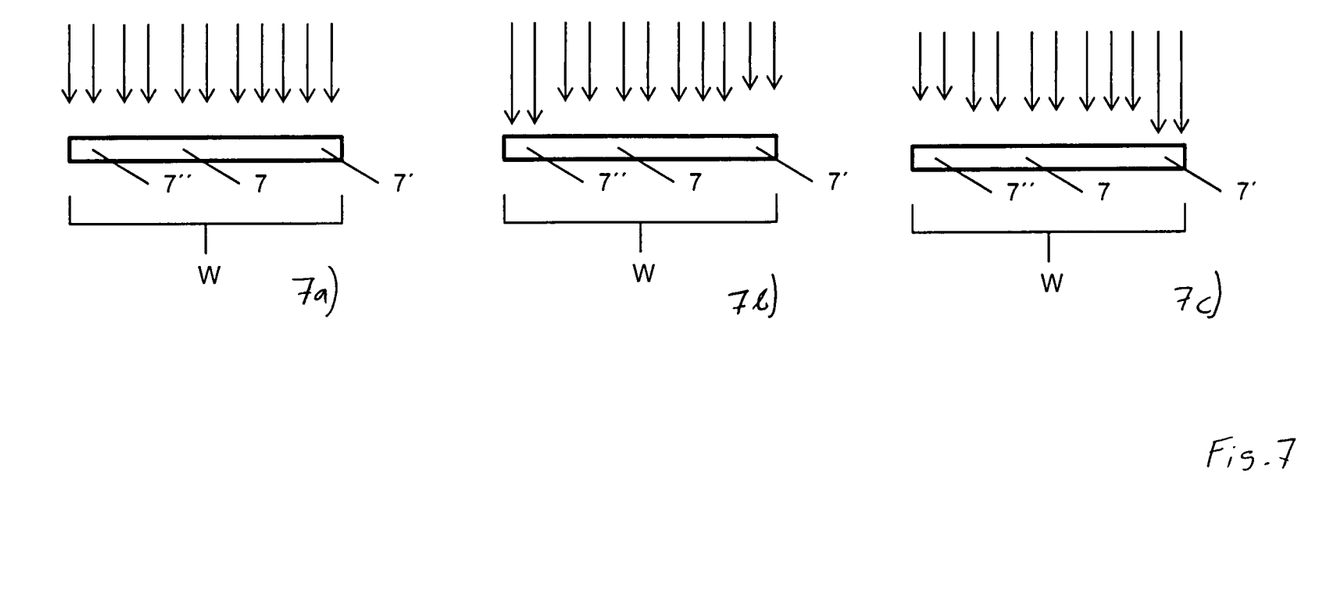
FIG. 7 shows flow pattern

FIG. 3 shows a first embodiment of the adjustment means, which is, in the present example a plate 19. This plate 19 is located in the straight part 14 of the conveyor belt 7 and extends over the length L, as can be seen in FIG. 2. The plate 19 is partially located in the duct 18 and extends into a control area 21. The plate 19 pivots around an axis 26. The degree of deflection relative to its vertical position is depicted by double-arrow α. The plate 19 guides and splits the fluid flow 31 after it has passed the heating means, so that the desired flow pattern over the width of the conveyor belt is achieved. By means of the plate 19, the flow 31 can be split and guided from the outside 7″ of belt 7 to the inside 7′ and vice versa. Every desired fluid-flow distribution over the width W can be achieved by means of plate 19. Examples for fluid-flow distributions are shown in FIG. 7. The desired fluid-flow distribution is achieved over the entire length L of plate 19. Equalization means 20, here a perforated plate, are located at the bottom of the control area 21 to support the flow-distribution of plate 19 and/or increase the pressure in the control area. After the fluid flow has heated products 25, it passes through the permeable belt 7 and is the deflected by an inclined plate 22. The flow 23 inside chamber 3 flows past the helical path 8 and is then sucked up again by fan 16 via inlet 24. Plate 19 is motor driven (not depicted). The motor itself is connected to a PLC-controller or adjusted by an operator. The position of the plate can be maintained in the same position throughout the entire process or altered in case the cooked products are not as desired and/or the recipe or the incoming product changes. The PLC-controller can be additionally connected to a measurement device which measures certain parameters. Based on these measurements, the position of the plate 19 is adjusted automatically. FIG. 2 also shows the position and extension of the adjustment means in the chamber 4.

Figure 4:
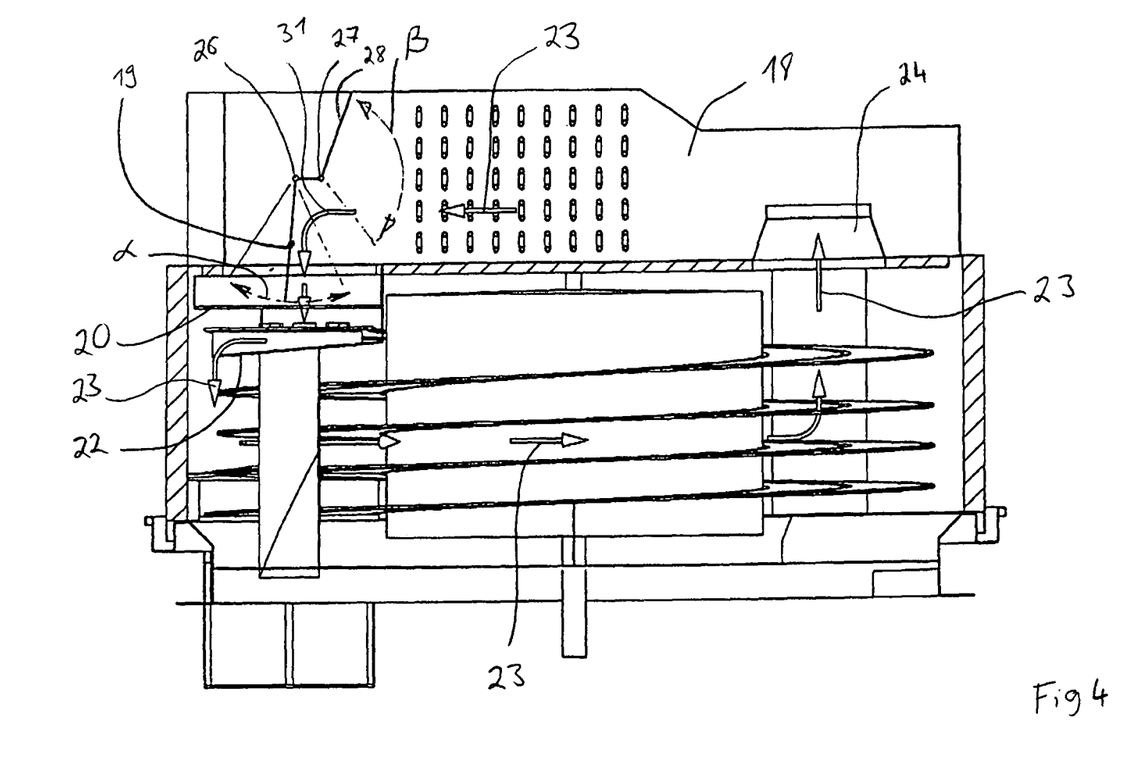
FIG. 4 shows even another embodiment of the adjustment means.

FIG. 4 shows another embodiment of the inventive oven, whereas the adjustment means comprise two plates 19, 28. Plate 19 is pivotable as described according to FIG. 3. Plate 28, which is similarly built and operated as plate 19, is pivotable around axis 27. The degree of its defection relative to the horizontal is depicted by arrow β. The two plates allow an even improved control of the flow-rate-distribution over the belt width W.

Figure 5:
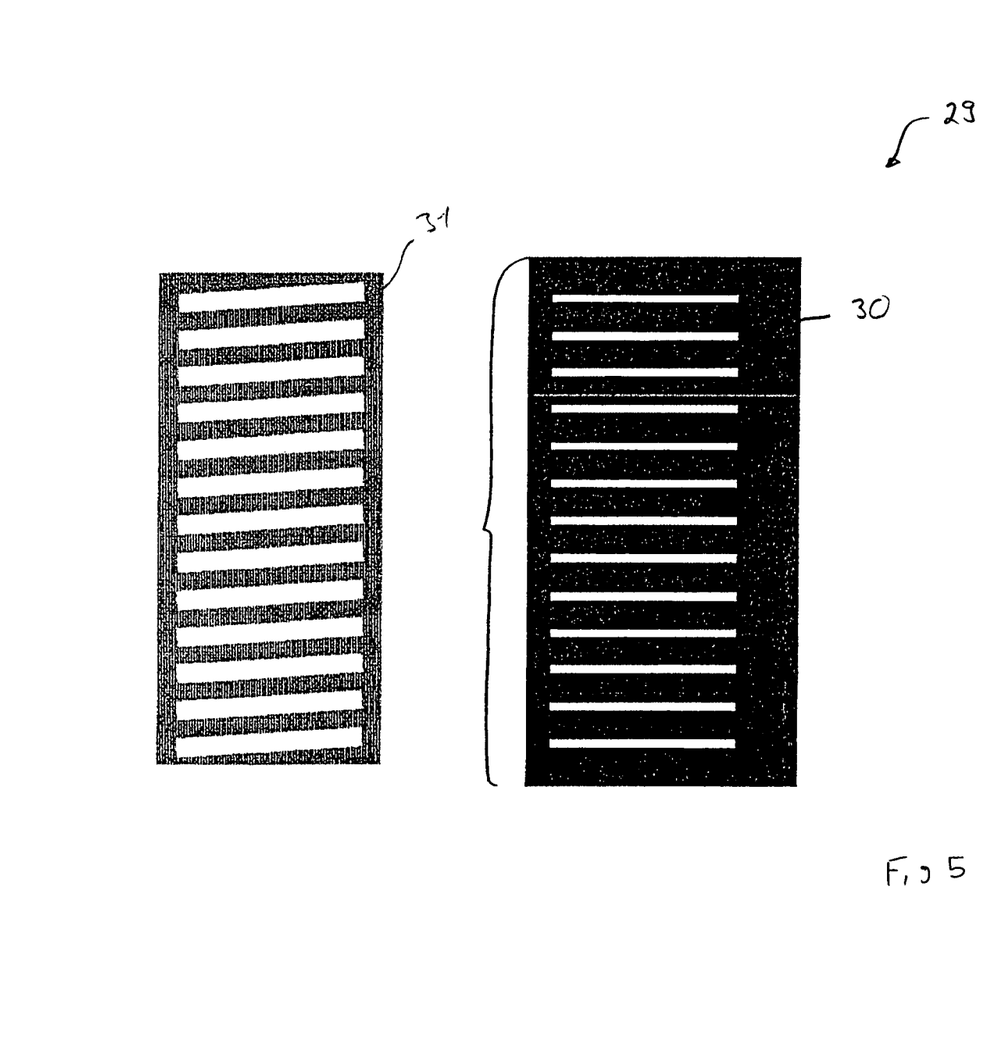
FIGS. 5, 6 show a third embodiment of the adjustment means.
Figure 6:
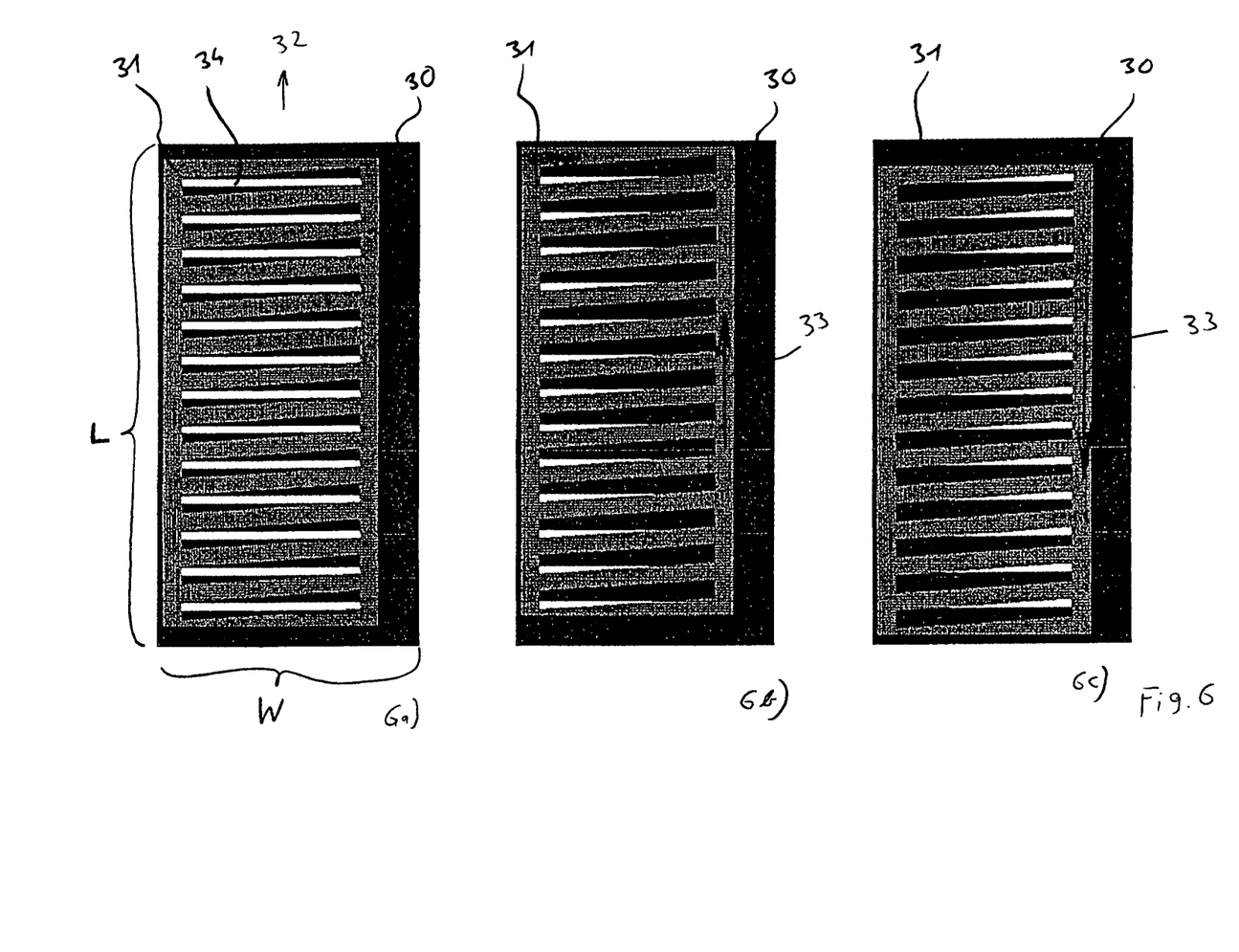

FIGS. 5 and 6 show yet another embodiment of the adjustment means. It comprises two plates 31, 30, each having a multitude of parallel, equidistant slots. The slots in plate 31 are larger than the slots in plate 30 and are slightly tilted. The plates 31, 30 extend over the entire width W of the belt 7 and have a length L. The number of slots needed is dependant from the length L over which the flow rate distribution shall be controlled. As can be seen from FIG. 6, plate 31 is placed on top of plate 30 and is, as depicted by arrow 33, shiftable relative to plate 30 and preferably parallel to the motion 32 of the belt 7. Arrow 32 depicts the direction of motion of belt 7. The slots in the two plates define a passage 34 for the fluid flow. By shifting the at least one plate 31 relative to the other plate 30, the distribution of the flow rate over the belt width can be adjusted. FIG. 6a shows the two plates 30, 31 in a neutral position. The seize of the passage 34 is essentially uniform over the width W of the belt 7. FIG. 6b depicts a position of the plates, in which the fluid flow is directed to the outside 7″ of belt 7′, while FIG. 6c shows a position of the plates 30,31, which directs the flow to the inside 7′. The plate 31 can be actuated automatically, for example by a motor, which is connected to PLC-controller. Based on a set value or on measured parameters, the position of plate 31 is set.

FIG. 7 shows three examples of flow rate distributions, i.e. flow pattern, over the belt width. The length of the arrows is proportional to the local velocity, respectively. FIG. 7a shows a uniform flow rate over the belt width. In FIG. 7b, the velocity is higher at the outside 7″ of belt 7 than at the inside 7′ and in FIG. 7c the other way round. The integral of the local velocities over the width W is in all cases the same. The person skilled in the art understands, however, that due to a better distribution of the flow rate over the belt width, for example a uniform distribution, the overall flow rate can be increased and thus the cooking can be improved without damaging the resulting products.

Figure 8:
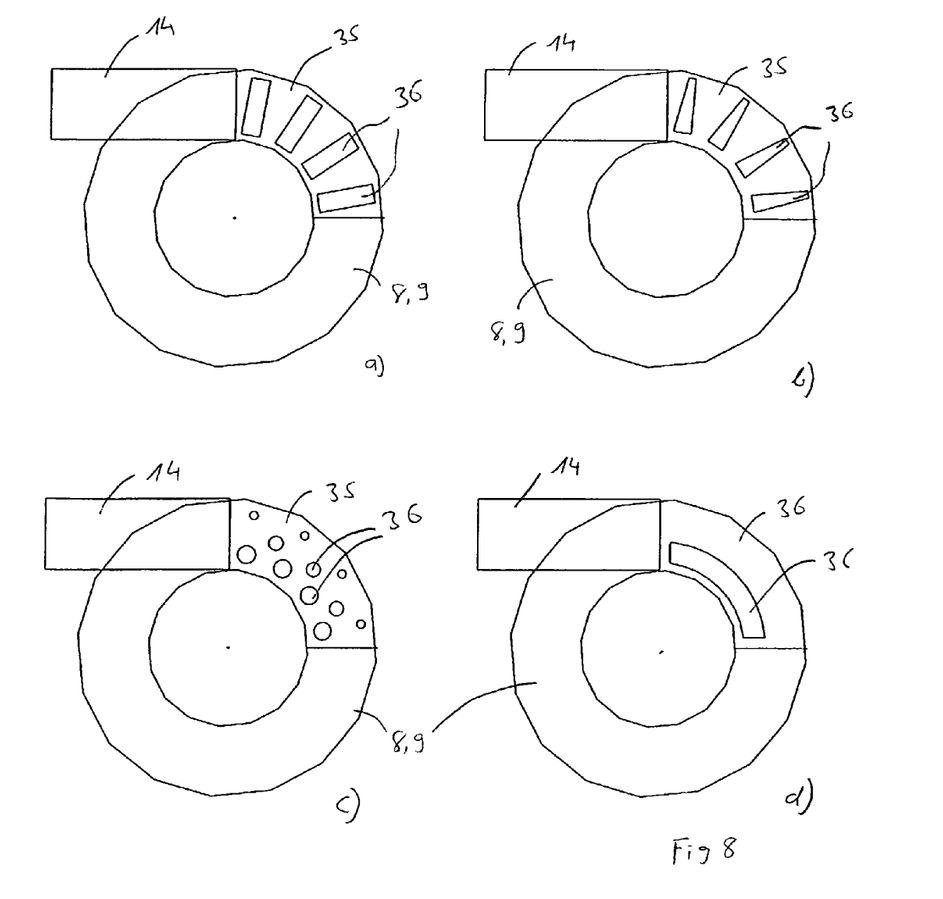
FIG. 8 shows four examples of the plate above the helical part.

FIG. 8 shows four embodiments of a plate 35 above the helical section 8, 9. The plate 35 extends over an angle of 90° and is locate right upstream and/or right downstream of the straight connecting section between the helical sections 8, 9. In the embodiment according to FIG. 8a, the plate comprises a multitude of rectangular holes, which are oriented essentially perpendicular to the motion of the conveyor belt 7. In the embodiment according to FIG. 8b, the holes are not rectangular, but decrease in width from the inside to the outside. The embodiment according to FIG. 8c shows a multitude of holes, whereas the number and/or the size of the holes at the inside of the plate is larger than at the outside. In FIG. 8d, there is only one hole, which is located at the inner side of the plate and which has a constant width. The plates can be exchanged manually.

Figure 9:
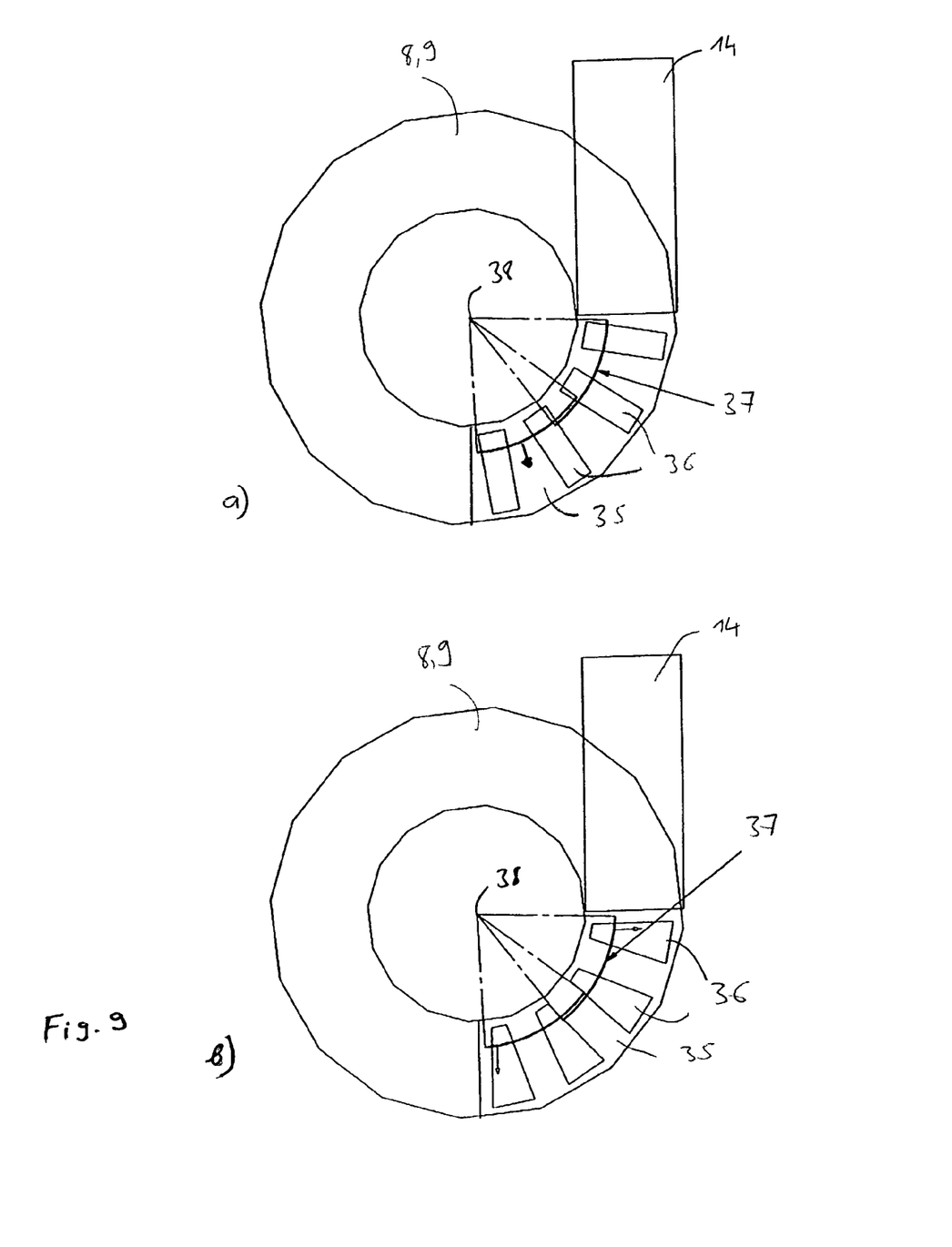
FIG. 9 shows an embodiment according to FIG. 8 with a deflector plate.

In FIG. 9, the embodiments according to FIG. 8a is shown with two deflector plates 37, which can be rotated around pivot 38 in order to direct more or less fluid-flow to the inside or the outside. The person skilled in the art understands that movement of the deflector plate can also be a pure translational movement or any combination of a translational and a rotational movement. FIG. 9b shows the embodiment according to FIG. 9a, whereas in this case, the holes 36 have a different shape, i.e. their width increase from the inside to the outside.

REFERENCE SIGNS 1 oven
2 separation means, partition
2.1 passage from first- to second chamber
3 first chamber
4 second chamber
5 drum
6 drum
7 conveyor means, conveyor belt
7′ inside of the conveyor means
7″ outside of the conveyor means
8 helical section first chamber
9 helical section second chamber
10 inlet
11 straight conveyor means
12 outlet
13 straight conveyor means
14 connecting conveyor means section
15 temperature control means, heating means
16 fan
17 spiral casing
18 air duct
19 control means, valve
20 equalization means
21 control area, box
22 guiding means
23 flow of the fluid
24 inlet 25 product
26 pivot
27 pivot
28 control means, valve
29 arrow
30 bottom plate
31 top plate
32 motion direction of the belt 7
33 movement of the top plate 31
34 passage for the fluid flow
35 adjustment means above the helical part, plate
36 hole
37 deflector plate
38 pivot
W width of the conveyor means
L Length over which the air flow is controlled
α angel
β angel

What is claimed is:

1. An oven comprising:
   a. a first chamber;
   b. a second chamber;
   c. a conveyor means with a width for guiding products from an inlet through the first chamber and the second chamber to an outlet, wherein the conveyor means are at least partially arranged in a helical path,
   d. a temperature control means for controlling the temperature and/or humidity in the first chamber and the second chamber using a fluid, the temperature control means including:
      i. a heater to heat the fluid and
      ii. a duct to introduce the heated fluid into the first chamber and the second chamber,
   e. a fan that circulates fluid so that there is fluid-motion in the oven; and
   f. a means to adjust the flow distribution over the width of the conveyor means depending on at least one process parameter and/or a recipe; and
   wherein the second chamber includes a second helical path, and the two helical paths are connected by a straight conveyor means section, and
   wherein the means are located over the conveyor means.

2. An oven comprising:
   a. a first chamber;
   b. a conveyor means with a width for guiding products from an inlet through the first chamber to an outlet, wherein the conveyor means are at least partially arranged in a helical path,
   c. a temperature control means for controlling the temperature and/or humidity in the first chamber using a fluid, the temperature control means including:
      i. a heater to heat the fluid and
      ii. a duct to introduce the heated fluid into the chamber,
   d. a fan that circulates fluid so that there is fluid-motion in the oven;
   e. a means to adjust the flow distribution over the width of the conveyor means depending on at least one process parameter and/or a recipe, and
   f. a fluid flow adjustment means in an area of the helical path, above the helical path.

3. The oven according to claim 1, wherein the means is at least one plate.

4. The oven according to claim 3, wherein the means are controlled by computer means.

5. The oven according to claim 1, wherein the oven comprises a measurement device and the means are adjusted according to the signal of the measurement device.

6. The oven according to claim 1, wherein the means are located in an area where the heated fluid is introduced into the chamber.

7. The oven according to claim 2, wherein the oven comprises a second chamber with a second helical path and the two helical paths are connected by a straight conveyor means section.

8. The oven according to claim 7, wherein the means are located in the straight conveyor means section.

9. The oven according to claim 2, wherein the oven comprises a perforated plate to equalize the flow.

10. The oven according to claim 7, wherein the adjustment means is a plate and/or a deflector.

11. The oven according to claim 1, wherein the oven comprises a means to fluctuate the volume flow of the heated fluid, fluid temperature, fluid humidity, and/or fluid velocity, and direct the heated fluid through a plate towards the conveyor means.

12. The oven according to claim 11, wherein the flow is increased in one part of the belt and simultaneously decreased in another part of belt.

13. A process comprising:
    a. providing an oven comprising:
       i. a first chamber;
       ii. a conveyor means with a width for guiding products from an inlet through the first chamber to an outlet, wherein the conveyor means are at least partially arranged in a helical path,
       iii. a temperature control means for controlling temperature and/or humidity in the first chamber using a fluid, wherein the temperature control means include
          A. a heater to heat the fluid and
          B. a duct to introduce the heated fluid into the first chamber,
       iv. a fluid flow adjustment means; and
       v. a fan that circulates the heated fluid so that there is fluid-motion in the oven;
    b. adjusting flow distribution of the heated fluid over the width of the conveyor means based on at least one process parameter and/or a recipe,
    wherein the fluid flow adjustment means are provided in an area of the helical path, above the helical path.

14. The process according to claim 13, wherein the process includes a step of increasing the flow of the heated fluid in one part of the belt and simultaneously decreased in another part of belt.

15. The process according to claim 13, wherein a magnitude of flow is not significantly influenced by the adjustment of a means.

16. The process according to claim 15, wherein the means are controlled based on a measurement and the measurement is an inline measurement.

17. The process according to claim 15, wherein the process includes a step of guiding and/or dividing the flow of the heated fluid by the means.

18. The process according to claim 15, wherein the means are adjusted automatically.

19. The oven according to claim 1, wherein the oven comprises:
    a. a perforated plate to equalize the fluid-motion;
    b. a fluid flow adjustment means including:
       i. a top plate having slots and
       ii. a bottom plate having slots; and
    c. a pivot;
    wherein the means pivots around the pivot so that a desired flow distribution over the width of the of the conveyor means is achieved, and wherein the slots in the top plate are larger than the slots in the bottom plate.

20. The oven according to claim 1, wherein the means are located in the straight conveyor means section.

* * * * *